US012678695B2

(12) United States Patent　　　　(10) Patent No.:　US 12,678,695 B2
Gao et al.　　　　　　　　　　　　(45) Date of Patent:　Jul. 14, 2026

(54) METHOD AND APPARATUS FOR DISPLAYING GAME PICTURE, STORAGE MEDIUM AND ELECTRONIC DEVICE

(71) Applicant: Tencent Technology (Shenzhen) Company Limited, Shenzhen (CN)

(72) Inventors: Hao Gao, Shenzhen (CN); Lin Lin, Shenzhen (CN); Shanshan Qian, Shenzhen (CN); Haohui Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 385 days.

(21) Appl. No.: 18/216,390

(22) Filed: Jun. 29, 2023

(65) Prior Publication Data

US 2023/0338850 A1　　Oct. 26, 2023

Related U.S. Application Data

(63) Continuation of application No. PCT/CN2022/120397, filed on Sep. 22, 2022.

(30) Foreign Application Priority Data

Nov. 19, 2021　(CN) .......................... 202111408249.2

(51) Int. Cl.
　　A63F 13/5378　　(2014.01)
　　A63F 13/79　　　(2014.01)
(52) U.S. Cl.
　　CPC .......... A63F 13/5378 (2014.09); A63F 13/79 (2014.09)

(58) Field of Classification Search
　　None
　　See application file for complete search history.

(56) References Cited

U.S. PATENT DOCUMENTS 5,470,080 A　　11/1995　Naka et al.
2014/0024450 A1 *　1/2014　Ramachandran ....... A63F 13/79
　　　　　　　　　　　　　　　　　　463/31

(Continued)

FOREIGN PATENT DOCUMENTS

CN　　109331468 A　　2/2019
CN　　112619167 A　　4/2021

(Continued)

OTHER PUBLICATIONS

Tencent Technology, ISR, PCT/CN2022/120397, Dec. 14, 2022, 3 pgs.

(Continued)

*Primary Examiner* — Jason T Yen
(74) *Attorney, Agent, or Firm* — Morgan, Lewis & Bockius LLP

(57)　　　　　ABSTRACT
This application discloses a method for displaying a game picture performed by an electronic device. The method includes: displaying a first game picture of a first user account in a target game associated with at least one additional user account, the first game picture including an account identification of the at least one additional user account; and in response to a selection operation triggered on an account identification of a second user account in the at least one additional user account, displaying a second game picture of the second user account in the target game within the first game picture. This application solves the technical problem that the display mode of the game picture is relatively monotonous.

17 Claims, 11 Drawing Sheets

(56) References Cited

U.S. PATENT DOCUMENTS

| | | | | |
|---|---|---|---|---|
| 2019/0250699 A1* | 8/2019 | Mulase | ............... | G06F 3/04842 |
| 2022/0062774 A1* | 3/2022 | Mulase | ................ | A63F 13/795 |

FOREIGN PATENT DOCUMENTS

| | | |
|---|---|---|
| CN | 113244609 A | 8/2021 |
| CN | 113398566 A | 9/2021 |
| CN | 113521755 A | 10/2021 |
| CN | 114042316 A | 2/2022 |
| JP | 2005160579 A | 6/2005 |
| JP | 2008011941 A | 1/2008 |
| JP | 2009070076 A | 4/2009 |
| JP | 2011018147 A | 1/2011 |
| JP | 2014018324 A | 2/2014 |
| JP | 2015160142 A | 9/2015 |

OTHER PUBLICATIONS

Tencent Technology, WO, PCT/CN2022/120397, Dec. 14, 2022, 4 pgs.
Tencent Technology, IPRP, PCT/CN2022/120397, May 2, 2024, 5 pgs.
Tencent Technology, Japanese Office Action, JP Patent Application No. 2024-520564, Jan. 31, 2025, 9 pgs.
GameSpark.jp, "I Thought About the PS5's Share Screen Feature—Maybe a Good Way to Get Excited About Common Topics While Playing the Same Game!", Game Spark, Global Gaming News, Dec. 2020, Retrieved from the Internet: https://www.gamespark.jp/article/2020/12/04/104356.html.
Game-Reviews.Club.com. "PlayStation 5: How to Organize a Party and Share Screen", Co-op Game Information/Communication, Jul. 2021, Retrieved from the Internet: https://www.game-reviews.club/archives/14099#google_vignette.

* cited by examiner

Figure 2:
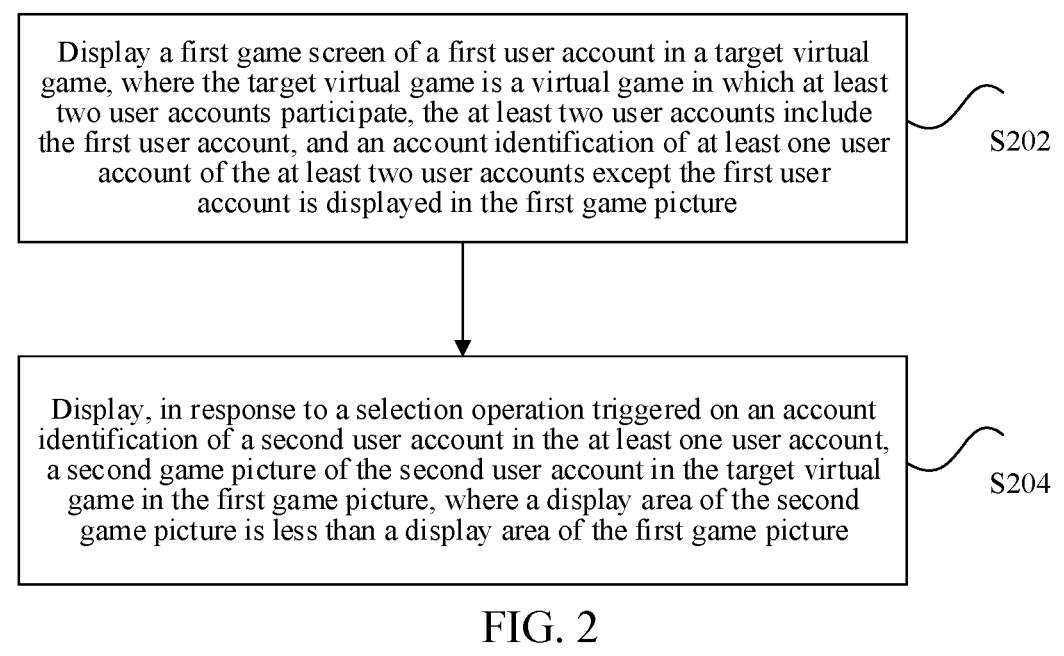

Display a first game screen of a first user account in a target virtual game, where the target virtual game is a virtual game in which at least two user accounts participate, the at least two user accounts include the first user account, and an account identification of at least one user account of the at least two user accounts except the first user account is displayed in the first game picture

S202

Display, in response to a selection operation triggered on an account identification of a second user account in the at least one user account, a second game picture of the second user account in the target virtual game in the first game picture, where a display area of the second game picture is less than a display area of the first game picture

Account identification 304

First game picture 302

(a)

Account identification 304

First game picture 302

Second game picture 306

(b)

Account identification 304

First game picture 302

Second game picture 306

(a)

Account identification 304

First game picture 302

(b)

Account identification 304

First game picture 302

Second game picture 306

(a)

Second game picture 306

(b)

Target key
information 1002

Account
identification 304

First game picture
302

Second game picture 306

(a)

(b)

(c)

1

METHOD AND APPARATUS FOR DISPLAYING GAME PICTURE, STORAGE MEDIUM AND ELECTRONIC DEVICE

CROSS-REFERENCE TO RELATED APPLICATIONS

This application is a continuation application of PCT Patent Application No. PCT/CN2022/120397, entitled "METHOD AND APPARATUS FOR DISPLAYING GAME PICTURE, STORAGE MEDIUM AND ELEC-TRONIC DEVICE" filed on Sep. 22, 2022, which claims priority to Chinese Patent Application No. 202111408249.2, entitled "METHOD AND APPARATUS FOR DISPLAY-ING GAME PICTURE, STORAGE MEDIUM AND ELECTRONIC DEVICE" filed with the Chinese Patent Office on Nov. 19, 2021, all of which is incorporated herein by reference in its entirety.

FIELD OF THE TECHNOLOGY

This application relates to the field of computers, in particular to a method and apparatus for displaying a game picture, a storage medium and an electronic device.

BACKGROUND OF THE DISCLOSURE

In recent years, with the rapid development of games, games, especially multi-player cooperative/confrontational games are increasingly favored by more and more users. However, in the cases where multiple players participate in a game, a user can only see the game picture of his/her own account, or can only see the game picture of one account of an enemy/friend.

The reason is that the display mode of the game picture in the related art is relatively monotonous, that is, only the game picture of one account is displayed, while the player's need for the display and comparison of the game pictures of multiple accounts in the game process is ignored. Therefore, there is a problem that the display mode of the game picture is relatively monotonous.

For the foregoing problem, no effective solution has been provided at present.

SUMMARY

Embodiments of this application provide a method and apparatus for displaying a game picture, a storage medium and an electronic device, to at least solve the technical problem that the display mode of the game picture is relatively monotonous.

Provided in one aspect of the embodiments of this application is a method for displaying a game picture performed by an electronic device and the method including: displaying a first game picture of a first user account in a target game associated with at least one additional user account, the first game picture including an account identification of the at least one additional user account; and in response to a selection operation triggered on an account identification of a second user account in the at least one additional user account, displaying a second game picture of the second user account in the target game within the first game picture.

According to another aspect of the embodiments of this application, a non-transitory computer-readable storage medium stores a computer program therein. The computer program, when executed by a processor of a computer device, causes the computer device to perform the above method for displaying the game picture.

According to still another aspect of the embodiments of this application, an electronic device is provided, including a memory, a processor, and a computer program stored in the memory that, when executed by the processor, causes the electronic device to implement the foregoing method for displaying a game picture by executing the computer program.

In the embodiment of this application, a first game picture of a first user account in a target game is displayed, where the foregoing target game is a game joined by at least two user accounts, the foregoing at least two user accounts include the foregoing first user account, and an account identification of at least one user account of the foregoing at least two user accounts except the foregoing first user account is displayed in the foregoing first game picture; and displaying, in response to a selection operation triggered on an account identification of a second user account in the at least one user account, a second game picture of the foregoing second user account in the foregoing target game in the foregoing first game picture, where a display area of the foregoing second game picture is less than a display area of the foregoing first game picture. By using the display mode of picture-in-picture (PIP), game pictures of multiple user accounts are displayed at the same time during the game process, which achieves the purpose of improving the display fullness of the game picture by using more diverse display modes, and realizes the technical effect of improving the display diversity of the game picture, thus solving the technical problem that the display mode of the game picture is relatively monotonous.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings:

FIG. 2 is a schematic flowchart of a method for displaying a game picture according to one embodiment of this application.

DESCRIPTION OF EMBODIMENTS

Figure 1:
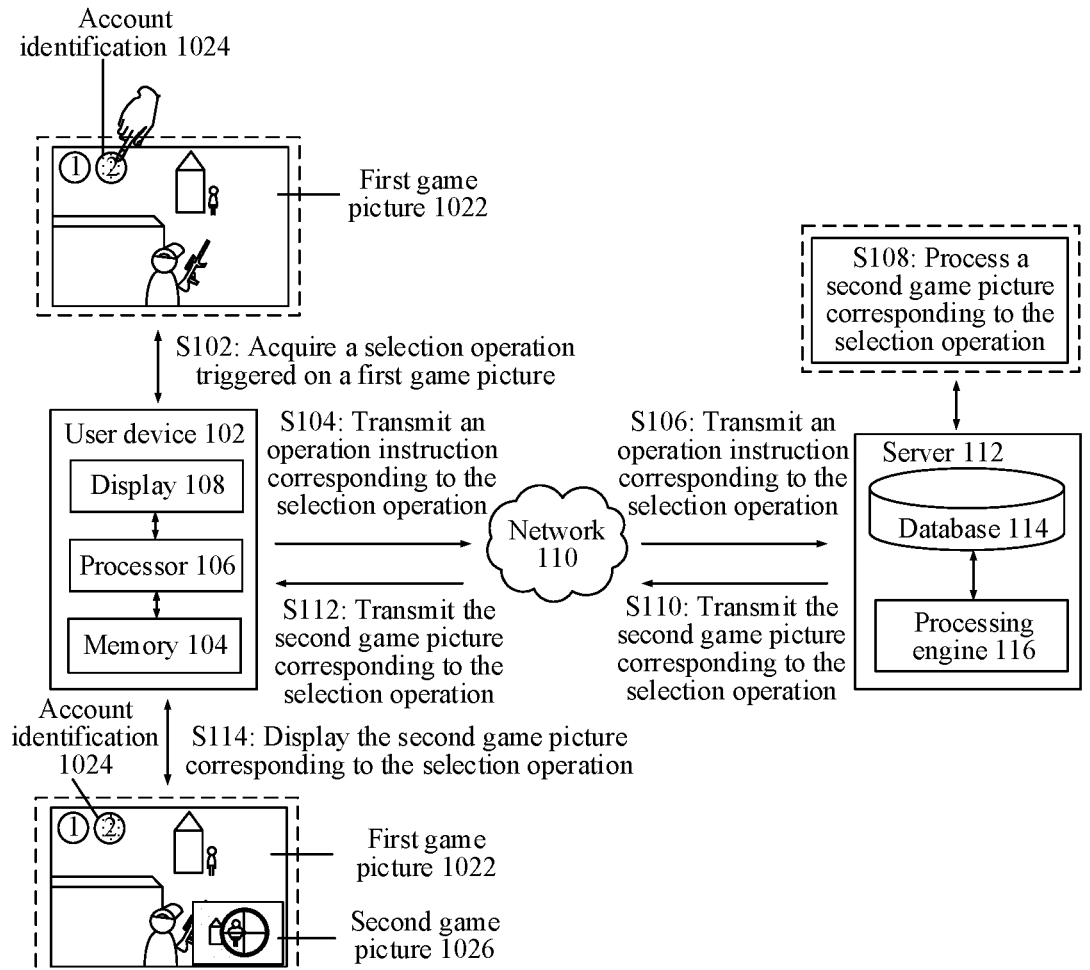
FIG. 1 is a schematic diagram of an application environment of a method for displaying a game picture according to one embodiment of this application.

In order to make persons skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

It should be noted that, In the specification, claims, and the foregoing accompanying drawings of the present disclosure, the terms "first", "second", and so on are intended to distinguish between similar objects rather than indicating a specific order. It is to be understood that such used data is interchangeable where appropriate so that the embodiments of this application described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

According to one aspect of the embodiments of this application, a method for displaying a game picture is provided. As an implementation, the foregoing method for displaying a game picture can be applied to such as, but not limited to, the environment shown in FIG. 1. The application environment may include, but not limited to, a user device 102, a network 110 and a server 112, where the user device 102 may include, but not limited to, a display 108, a processor 106 and a memory 104.

The specific process may include the following steps S102 to S114:

step S102: Acquire, by the user device 102, a selection operation triggered on an account identification 1024 (2) in a first game picture 1022.

step S104 to step S106: Transmit, by the user device 102, an operation instruction corresponding to the selection operation to the server 112 through the network 110.

step S108: Process, by the server 112, the operation instruction corresponding to the selection operation through a processing engine 116, so as to acquire a second game picture 1026 corresponding to the selection operation.

step S110 to step S112: Transmit, by the server 112, the second game picture 1026 to the user device 102 through the network 110.

step S114: Display, by the processor 106 in the user device 102, the second game picture 1026 in the display 108 and store the second game picture 1026 in the memory 104.

In addition to the example shown in FIG. 1, the above steps can also be independently completed by the user device 102, that is, the user device 102 performs steps such as acquiring the second game picture, thereby reducing the processing pressure of the server. The user equipment 102 includes but not limited to a hand-held device (such as a mobile phone), a notebook computer, a desktop computer and a vehicle-mounted device. This application is not limited to the specific implementation of the user equipment 102.

As an implementation, the foregoing method for displaying a game picture can be implemented by an electronic device, where the electronic device can be a user device or a server. As shown in FIG. 2, the foregoing method for displaying a game picture includes:

S202: Display a first game picture of a first user account in a target game, where the target game is a game in which at least two user accounts participate, the at least two user accounts include the first user account, and an account identification of at least one user account of the at least two user accounts except the first user account is displayed in the first game picture.

S204: Display, in response to a selection operation triggered on an account identification of a second user account in the at least one user account, a second game picture of the second user account in the target game in the first game picture, where a display area of the second game picture is less than a display area of the first game picture.

In this embodiment, the foregoing method for displaying a game picture can be applied to such as, but not limited to, a game process to control display of the game picture, e.g., to display a process screen (the first game picture) of the first user account in the target game on a target client of the first user account, and to display, in case a selection operation is acquired from the account identification of the second user account in the first game picture, in response to the selection operation, a process screen (the second game picture) of the second user account in the target game in the first game picture in the form of PIP.

In this embodiment, the target game can be, but not limited to, a cooperative/confrontational game in which multiple user accounts participate. Taking the cooperative game as an example, multiple user accounts participating in the same target game are in the same faction and jointly complete a first virtual task in the form of cooperation. Taking the confrontational game as another example, multiple user accounts participating in the same target game are divided into at least two factions and complete a second virtual task in the form of confrontation.

In this embodiment, the first game picture may be, but not limited to, a game picture under a viewing angle of the first user account, and the second game picture may be, but not limited to, a game picture under a viewing angle of the second user account; or the first game picture may be, but not limited to, a game picture with the virtual object controlled by the first user account as the center, and the second game picture may be, but not limited to, a game picture with the virtual object controlled by the second user account as the center; or the first game picture/second game picture may be, but not limited to, game pictures of the same type, such as the game picture of a combat readiness interface.

Figure 3:
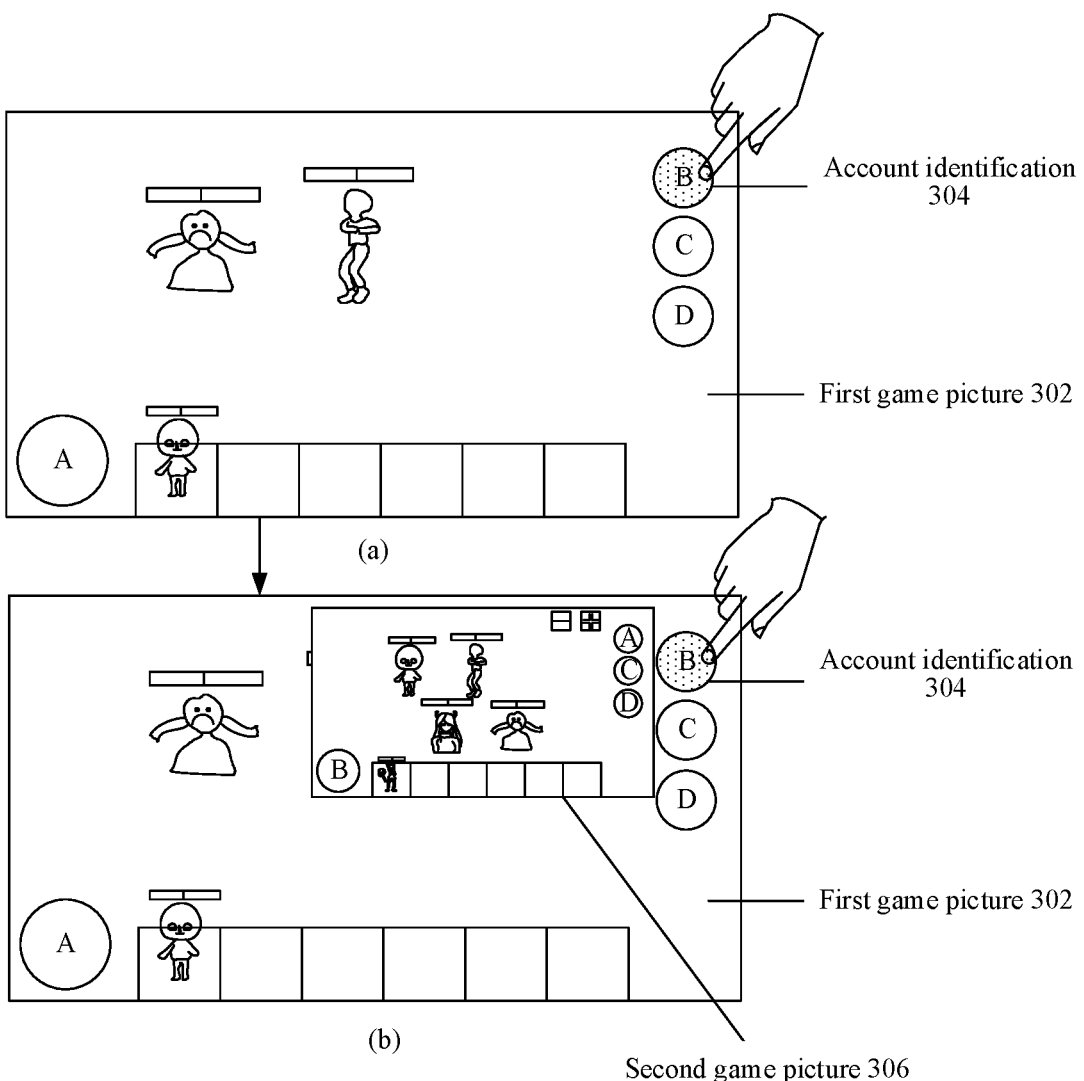
FIG. 3 is a schematic diagram of a method for displaying a game picture according to one embodiment this application.

Taking another example for further illustration, such as shown in FIG. 3, the first game picture 302 of the first user account in the target game is displayed, where the first game picture 302 may be, but not limited to, the screen of the combat readiness interface of the first user account in the target game, as shown in FIG. 3(*a*). Furthermore, as shown in FIG. 3(*b*), in response to a selection operation triggered on the account identification 304 of the second user account, the second game picture 306 of the second user account in the target game is displayed in the first game picture 302, where the second game picture 306 may be, but not limited to, the PIP of the first game picture 302.

In this embodiment, the at least one user account of the foregoing at least two user accounts except the first user account may be, but not limited to, a user account in the same faction as the first user account, and/or a user account in a faction different from that of the first user account. Since in some games, the game pictures of other user accounts often represent more comprehensive game information, thus when there is competition between user accounts, restrictions are often imposed on the viewing of game pictures by user accounts from different factions in the consideration of game balance. For example, assuming that user account A, user account B and user account C are user accounts participating in the target game, and user account A and user account B are in the same faction different from that of user account C, thus when a first game picture is displayed on a client of user account A, the account identification of user account B is also displayed on the client, so that the second game picture of user account B can be displayed in the form of PIP in case a selection operation is triggered on the account identification of user account B, while stricter restrictions are imposed on access to the game picture by user account C as an account from another faction.

Figure 4:
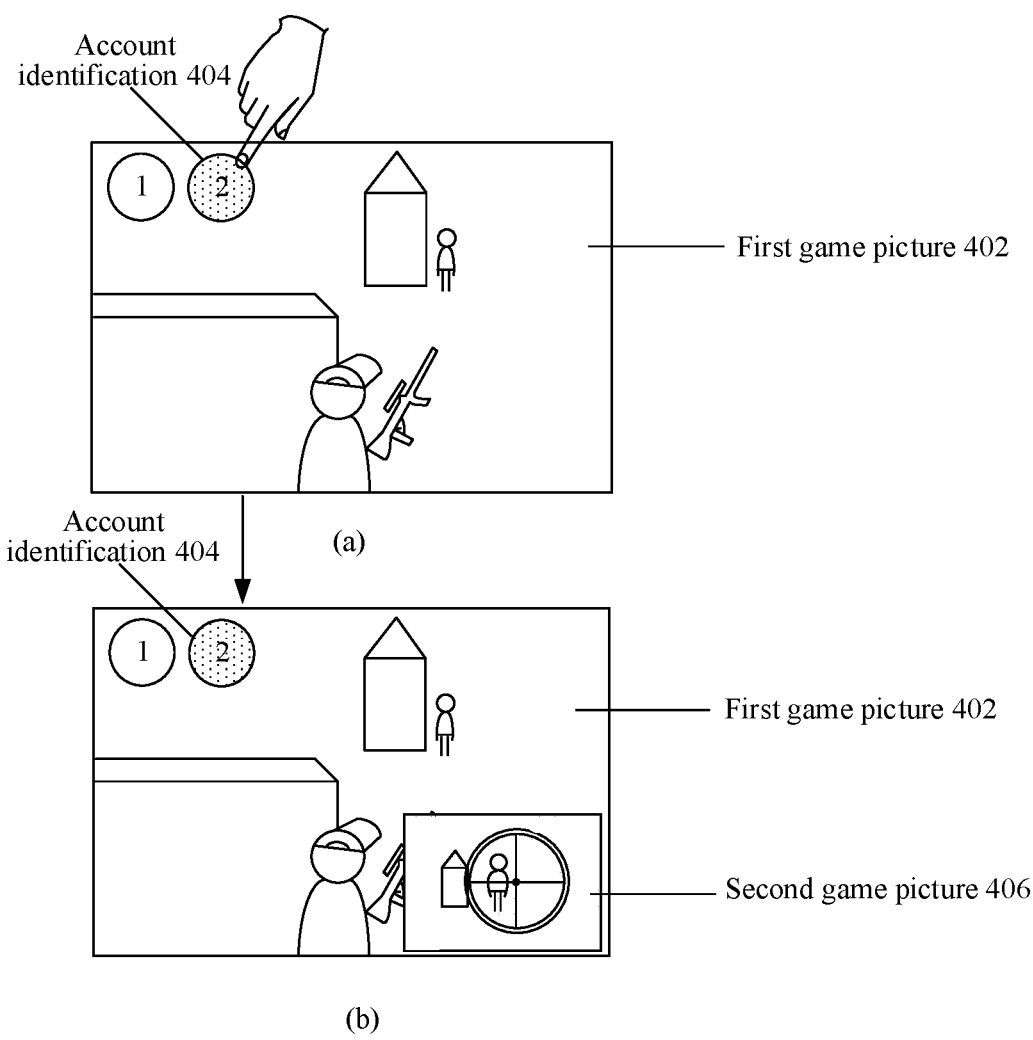
FIG. 4 is a schematic diagram of a method for displaying yet another game picture according to another embodiment of this application.

Taking another example for further illustration, as shown in FIG. 4, the first game picture 402 of the first user account in the target game is displayed, where the first game picture 402 may be, but not limited to, the screen under a viewing angle of the first user account in the target game, and multiple account identifications (1, 2) of user accounts in the same fraction as the first user account are also displayed on the first game picture 402, as shown in FIG. 4(*a*). Furthermore, as shown in FIG. 4(*b*), in response to a selection operation triggered on the account identification 404 of the second user account, the second game picture 406 under a viewing angle of the second user account in the target game is displayed in the first game picture 402, where the second game picture 406 may be, but not limited to, the PIP of the first game picture 402.

In this embodiment, the display area of the second game picture is less than the display area of the first game picture, that is, the second game picture may belong to the first game picture, or the second game picture may be a sub-picture of the first game picture, which is not limited herein. Since the display area of the second game picture is less than the display area of the first game picture, thus a viewer can acquire game information of the first user account and the second user account in a target game at the same time when the second game picture and the first game picture are displayed simultaneously, which can improve user's game experience no matter in terms of comparing game information of different user accounts, or in terms of improving the execution efficiency of a virtual task with more diverse game information.

It should be noted that, by using the display mode of PIP, the game pictures of multiple user accounts can be displayed at the same time in the game process, thus improving the display diversity of the game picture. In this way, the use of more diverse display modes can not only improve the display fullness of the game picture, but also provide the user with more comprehensive reference information, which improves the user's game experience.

Figure 5:
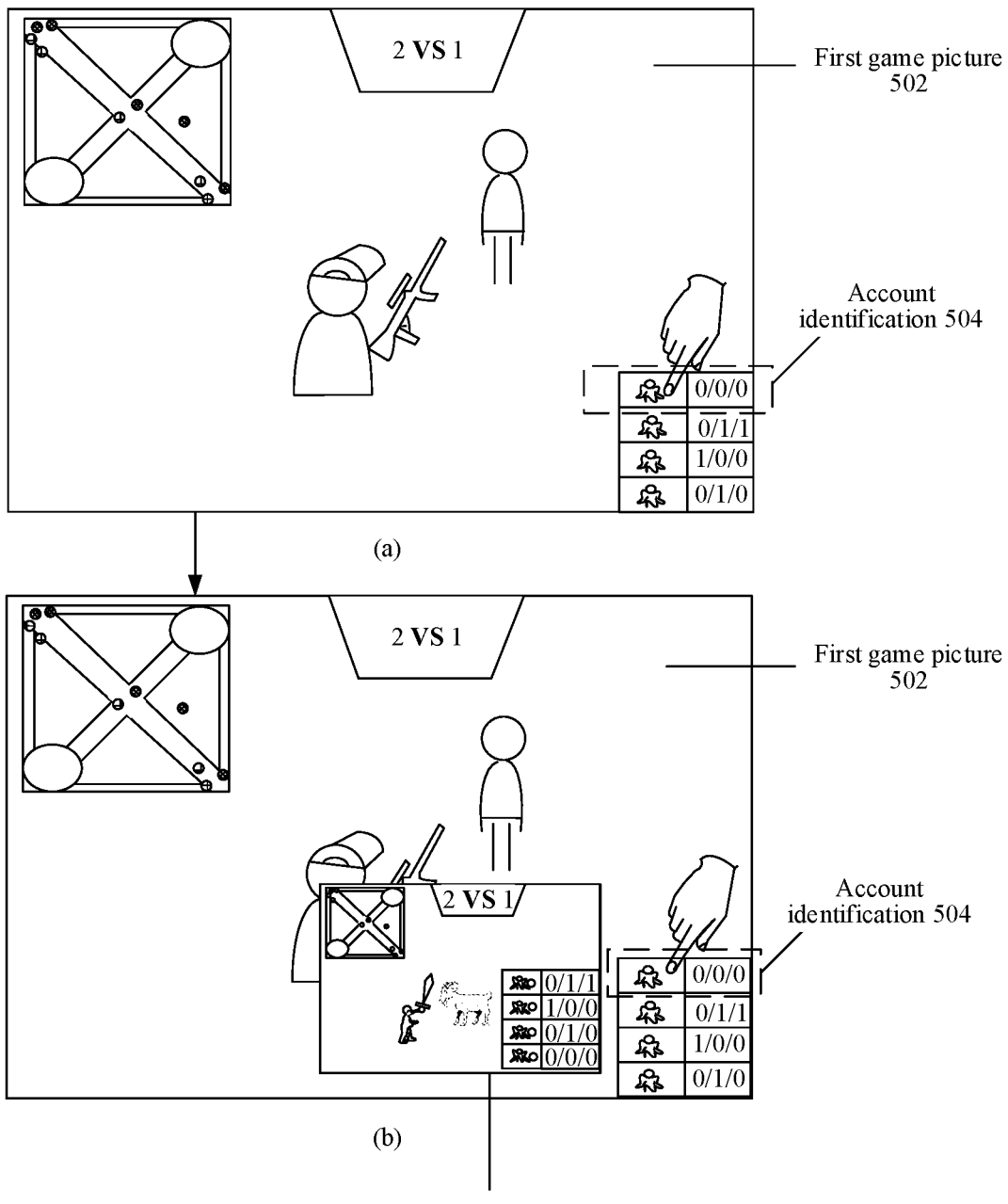
FIG. 5 is a schematic diagram of a method for displaying yet another game picture according to another embodiment of this application.

Taking another example for further illustration, as shown in FIG. 5, a first game picture 502 of a first user account in a target game is displayed, where the target game is a game in which at least two user accounts participate, the at least two user accounts include the first user account, and an account identification 504 of at least one user account of the at least two user accounts except the first user account is displayed in the first game picture 502, as shown in FIG. 5(*a*). Furthermore, as shown in FIG. 5(*b*), in response to a selection operation triggered on an account identification 504 of a second user account in the at least one user account, a second game picture 506 of the second user account in the target game is displayed in the first game picture 502, where a display area of the second game picture 506 is less than a display area of the first game picture 502.

It should be noted that, in the related art, a current game picture as a whole is adjusted to a game picture after switching usually by moving a virtual camera or manipulating a mini-map (such as a mini-map shown in the upper left corner of FIG. 5). However, such operation often causes the game picture after switching to cover the original game picture, which further adversely affects the display fullness of the game picture. While in this embodiment, by using the display mode of PIP, the effect of synchronously displaying game pictures of multiple user accounts in the game process can be achieved.

According to the embodiment of this application, a first game picture of a first user account in a target game can be displayed, where the target game is a game in which at least two user accounts participate, the at least two user accounts include the first user account, and an account identification of at least one user account of the at least two user accounts except the first user account is displayed in the first game picture; and in response to a selection operation triggered on an account identification of a second user account in the at least one user account, a second game picture of the second user account in the target game is displayed in the first game picture, where a display area of the second game picture is less than a display area of the first game picture. With the display mode of PIP, the game pictures of multiple user accounts are displayed at the same time in the game process, and then the purpose of improving the display fullness of the game picture by using more diverse display modes is achieved, which thus realizes the technical effect of improving the display diversity of the game picture.

As an embodiment, display a second game picture of the second user account in the target game in the first game picture, which includes: display the second game picture within a first region associated with the account identification of the second user account.

As an embodiment, after displaying a second game picture of the second user account in the target game in the first game picture, the method includes: display, in response to a selection operation triggered on an account identification of a third user account in the at least one user account, a third game picture of the third user account in the target game within a second region associated with the account identification of the third user account, where the first region is different from the second region.

In this embodiment, the first region/second region may be, but not limited to, a location region for displaying a game sub-picture (the second game picture/the third game picture), and display of the first region/second region may be, but not limited to, hidden.

Figure 6:
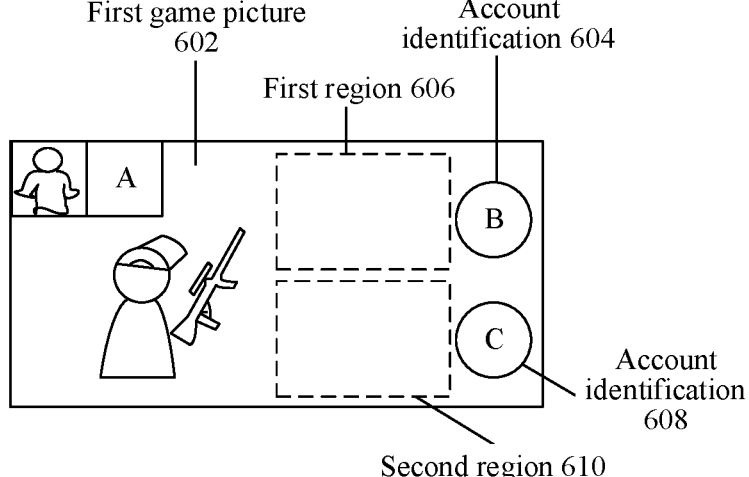
FIG. 6 is a schematic diagram of a method for displaying yet another game picture according to another embodiment of this application.

Taking another example for further illustration, as shown in FIG. 6, the account identification 604 (B) of the second user account and the account identification 608 of the third user account are also displayed in the first game picture 602. Furthermore, assuming that a selection operation triggered on the account identification 604 is acquired, then the second game picture is displayed within a first region 606 associated with the account identification 604 of the second user account; or assuming that a selection operation triggered on an account identification 608 is acquired, then a third game picture of the third user account in the target game is displayed within a second region 610 associated with the account identification 608 of the third user account, where the first region 606 is different from the second region 610.

According to the embodiment provided by this application, the second game picture is displayed within a first region associated with the account identification of the second user account; and in response to a selection operation triggered on an account identification of a third user account in the at least one user account, a third game picture of the third user account in the target game is displayed within a second region associated with the account identification of the third user account, where the first region is different from the second region, and by setting the game sub-picture (the second game picture/third game picture) in a region associated with the account identification of the user account, the relationship between the account identification and the game sub-picture can be displayed more visually, which achieves the effect of improving the display visualization of the game picture.

As an embodiment, display a second game picture of the second user account in the target game in the first game picture, which includes: display the second game picture within a target region.

As an embodiment, after displaying a second game picture of the second user account in the target game in the first game picture, the method includes: display, in response to a selection operation triggered on an account identification of the third user account in the at least one user account, a third game picture of the third user account in the target game is displayed within the target region.

In this embodiment, the target region may be, but not limited to, a preset display region. For example, before or during a target game, the display region of the game sub-picture can be configured by the configuration interface, such as setting the display region of the game sub-picture as the target area, or associating the display region of the game sub-picture with a corresponding account identification.

It should be noted that, display the second game picture within a target region. display, in response to a selection operation triggered on an account identification of the third user account in the at least one user account, a third game picture of the third user account in the target game is displayed within the target region.

Figure 7:
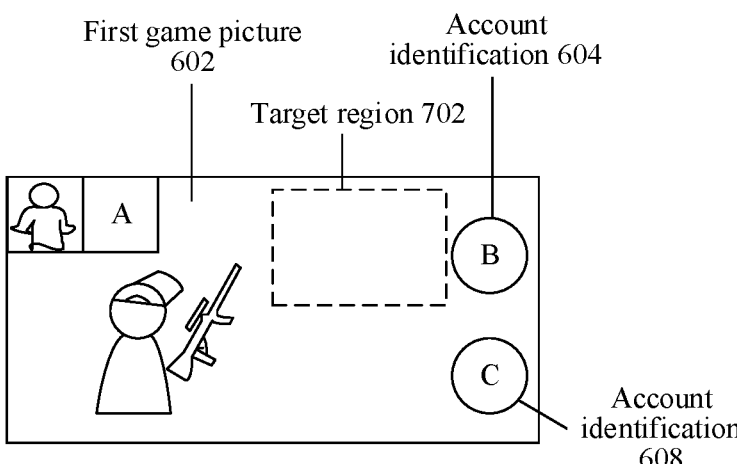
FIG. 7 is a schematic diagram of a method for displaying yet another game picture according to another embodiment of this application.

Taking another example for further illustration, based on FIG. 6, and further as shown in FIG. 7, a second game picture corresponding to the account identification 604 is displayed in the target region 702; and in response to a selection operation triggered on an account identification

608 of the third user account in the at least one user account, a third game picture of the third user account in the target game is displayed within the target region 702, or switch to a game picture displayed in the target region 702.

As an embodiment, after displaying a second game picture of the second user account in the target game in the first game picture, the method includes:

adjust, in response to a target adjustment operation on the second game picture, a display shape of the second game picture.

In this embodiment, the display shapes can include, but not limited to, a shape size, a shape type, etc. The first adjustment operation can be such as, but not limited to, manually adjusting the display shape of the second game picture, so as to meet the individual demand of the user. In addition, the first adjustment operation can further be such as, but not limited to, automatically adjusting the display shape of the second game picture, e.g., automatically adjusting the display shape of the second game picture until key information is not shielded when the display shape of the second game picture shields the key information in the first game picture, where the key information may include, but not limited to, virtual operation objects, game information, layout information and the like in the target game.

As an embodiment, after adjusting, in response to a target adjustment operation on the second game picture, a display shape of the second game picture, the method includes:

S1: Shrink, in response to a first adjustment operation on the second game picture, the display area of the second game picture, where in case where the display area of the second game picture is less than or equal to a hidden threshold, the second game picture is hidden; and S2: Expand, in response to a second adjustment operation on the second game picture, the display area of the second game picture to a target display area, where the target display area is equal to the display area of the first game picture.

It should be noted that, in response to a first adjustment operation on the second game picture, the display area of the second game picture is shrunk, where in case the display area of the second game picture is less than or equal to a hidden threshold, the second game picture is hidden.

Figure 8:
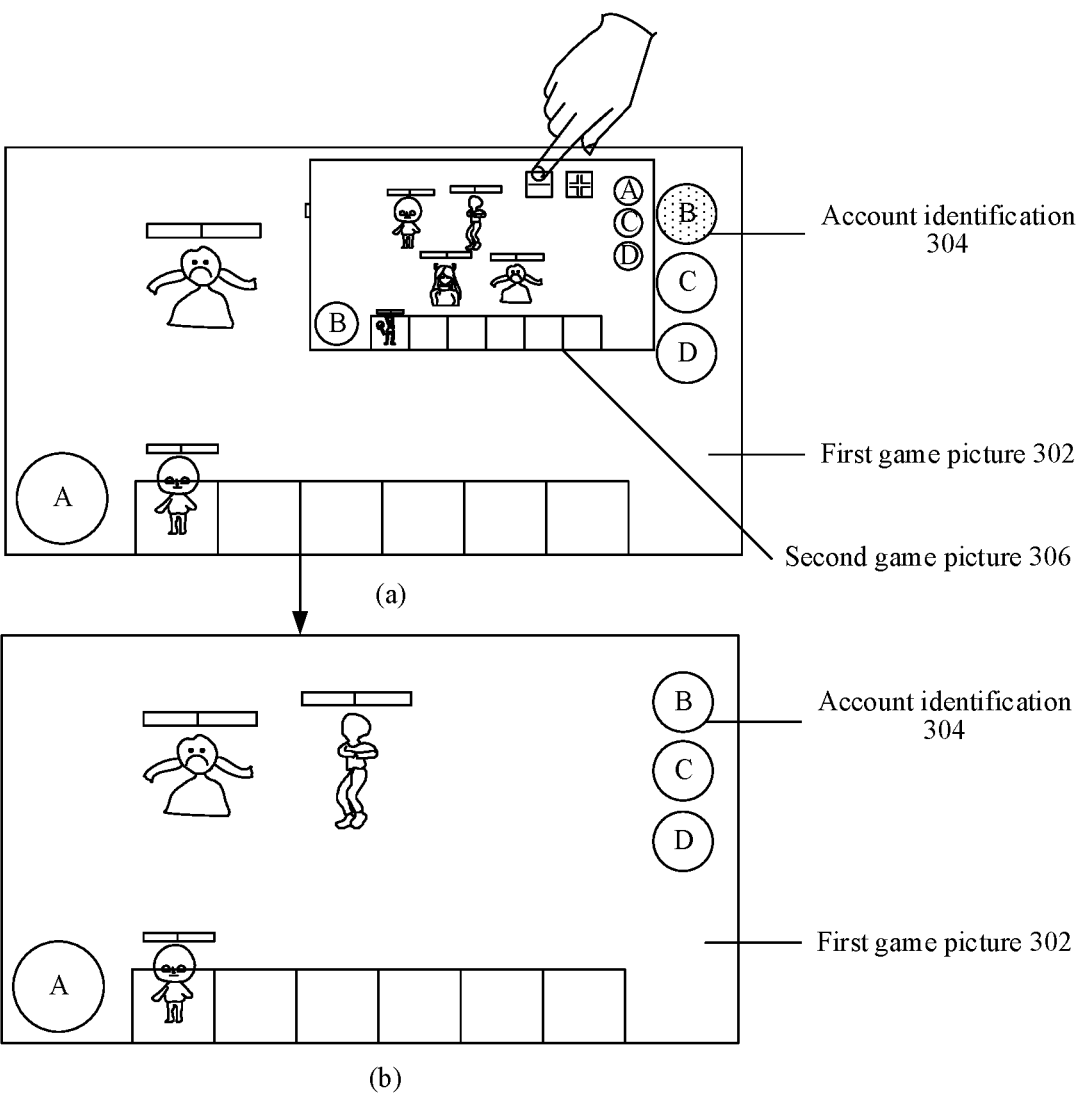
FIG. 8 is a schematic diagram of a method for displaying yet another game picture according to another embodiment of this application.

Taking another example for further illustration, referring to the scenario shown in FIG. 3, and further as shown in FIG. 8, a first adjustment operation on the second game picture 306 is acquired, as shown in FIG. 8(*a*). Furthermore, as shown in FIG. 8(*b*), in response to a first adjustment operation on the second game picture 306, the display area of the second game picture 306 is shrunk, where in case the display area of the second game picture 306 is less than or equal to a hidden threshold, the second game picture 306 is hidden.

It should be noted that, in response to a second adjustment operation on the second game picture, the display area of the second game picture is expanded to a target display area, where the target display area is equal to the display area of the first game picture.

Figure 9:
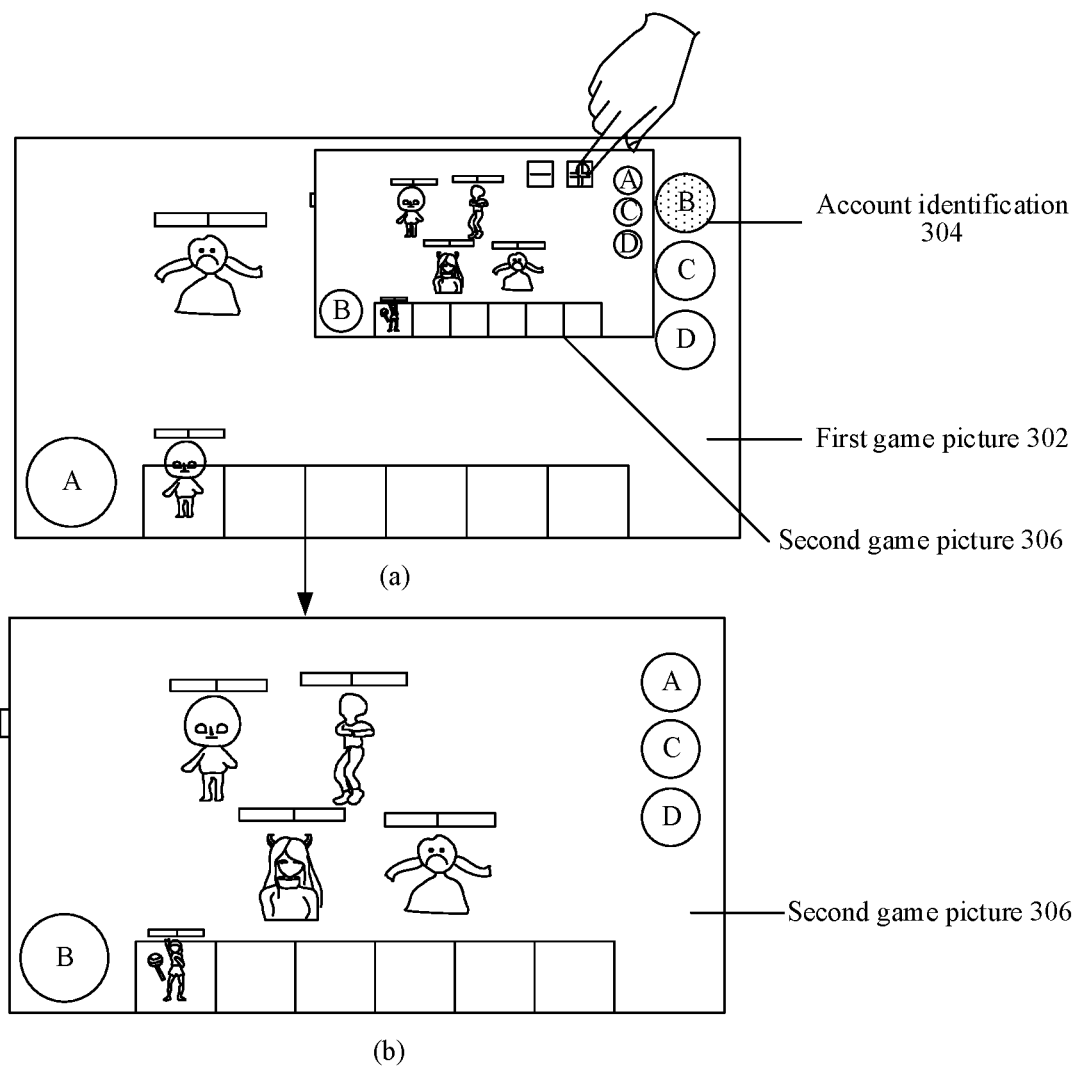
FIG. 9 is a schematic diagram of a method for displaying yet another game picture according to another embodiment of this application.

Taking another example for further illustration, based on the scenario shown in FIG. 3, and further as shown in FIG. 9, a second adjustment operation on the second game picture 306 is acquired, as shown in FIG. 9(*a*). Furthermore, as shown in FIG. 9(*b*), in response to a second adjustment operation on the second game picture 306, the display area of the second game picture 306 is expanded to a target display area, where the target display area is equal to the display area of the first game picture 302.

According to the embodiment of this application, in response to a first adjustment operation on the second game picture, the display area of the second game picture is shrunk, where in case the display area of the second game picture is less than or equal to a hidden threshold, the second game picture is hidden; and in response to a second adjustment operation on the second game picture, the display area of the second game picture is expanded to a target display area, where the target display area is equal to the display area of the first game picture. In this way, the effect of improving the flexibility of controlling the game picture is achieved.

As an embodiment, display a second game picture of the second user account in the target game in the first game picture, which includes:

display the second game picture and target key information in the first game picture, where the target key information includes at least one of the following: real-time game information of the second user account in the target game and historical game information of the second user account in a game joined before.

In this embodiment, the target key information can be such as, but not limited to, integrated information acquired by the computer through automatic recognition (image recognition, text recognition, etc.), such as virtual characters controlled by the second user account in the target game acquired through image recognition, and the quantity/type of virtual characters obtained through integrated processing.

Figure 10:
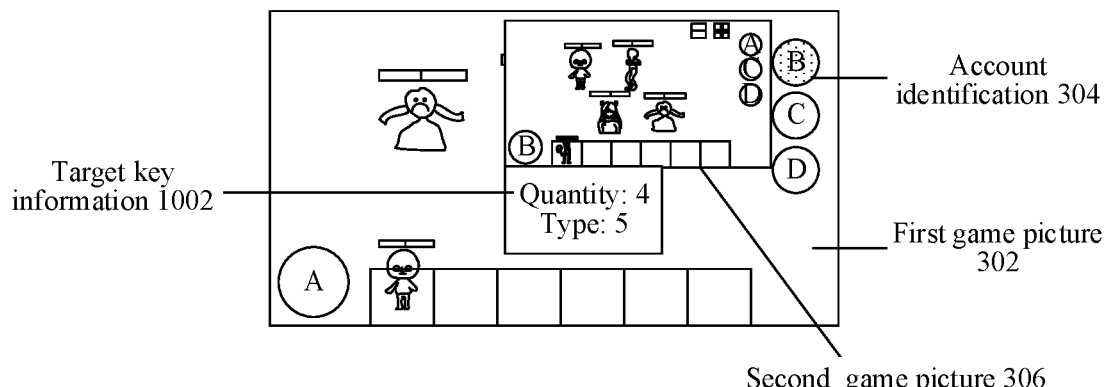
FIG. 10 is a schematic diagram of a method for displaying yet another game picture according to another embodiment of this application.

Taking another example for further illustration, based on the scenario shown in FIG. 3, and further as shown in FIG. 10, in the process of displaying the second game picture 306, it is also possible to display the target key information 1002 (such as the number and type of virtual characters controlled by the second user account, etc.) at an associated position of the second game picture 306, which is not limited herein; or it is also possible to display the target key information 1002 in the second game picture 306, which is not limited herein.

According to the embodiment of this application, the second game picture and target key information are displayed in the first game picture, where the target key information includes at least one of the following: real-time game information of the second user account in the target game and historical game information of the second user account in a game joined before. In this way, the effect of improving the display fullness of the game picture is achieved.

As an embodiment, before displaying, in response to a selection operation triggered on an account identification of a second user account in the at least one user account, a second game picture of the second user account in the target game in first game picture, the method includes:

S1: Acquire a target pressing operation triggered on the account identification of the second user account; and S2: In case where an operation duration of the target pressing operation reaches a target threshold, acquire a first selection operation with the account identification of the second user account as an operation object, where the first selection operation includes a selection operation triggered on the account identification of the second user account.

In this embodiment, the target pressing operation may be, but not limited to, a long press operation, or the target pressing operation can be regarded as a valid selection operation only when the operation duration of the target press operation reaches a target threshold.

As an embodiment, after acquiring a first selection operation with the account identification of the second user account as an operation object, the method includes:

S1: Hide a second game picture when the target pressing operation is ended; or

S1: In case where the target pressing operation is not ended and the operation object of the target pressing operation is switched from the account identification of the second user account to an account identification of a fourth user account, acquire a second selection operation with the account identification of the fourth user account as the operation object; and S2: Display, in response to the second selection operation, a fourth game picture of the fourth user account in the target game in the first game picture, where the at least one user account includes the fourth user account, and a display area of the fourth game picture is less than the display area of the first game picture.

In this embodiment, when the long press operation (target pressing operation) is ended, it is possible to end the display of the game sub-picture (second game picture), which is not limited herein; or an additional ending operation is set, and when the ending operation is obtained, the display of the game sub-picture (the second game picture) is ended.

In this embodiment, given that the trigger of the long press operation requires a certain waiting time, to improve the operation efficiency, if a sliding operation (that is, switching the operation object of the target pressing operation to another operation object) executed at the same time is identified before the long press operation is ended, instead of waiting for the operation duration to reach the target threshold, the execution of the selection operation is directly triggered, and the corresponding game sub-picture (the fourth game picture) is displayed, so that the waiting time for the operation duration is shortened, and the operation efficiency in the process of displaying the game picture is improved.

It should be noted that, in case the target pressing operation is not ended and the operation object of the target pressing operation is switched from the account identification of the second user account to an account identification of a fourth user account, a second selection operation with the account identification of the fourth user account as the operation object is acquired; and in response to the second selection operation, a fourth game picture of the fourth user account in the target game is displayed in the first game picture, where the at least one user account includes the fourth user account, and a display area of the fourth game picture is less than the display area of the first game picture.

Figure 11:
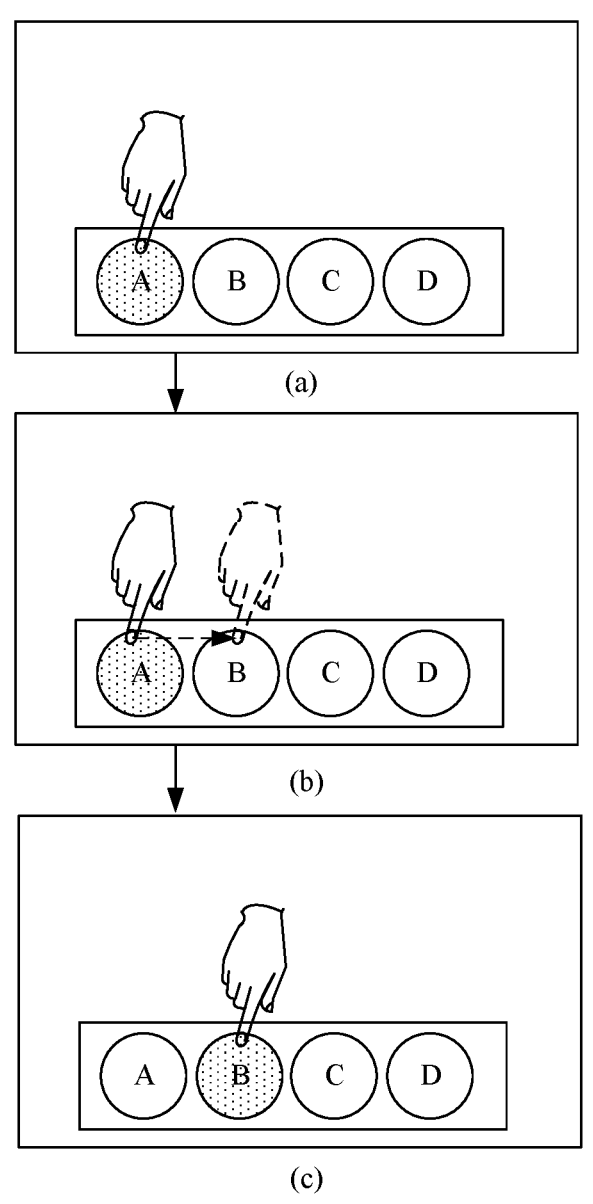
FIG. 11 is a schematic diagram of a method for displaying yet another game picture according to another embodiment of this application.

Taking another example for further illustration, such as shown in FIG. 11, in case an operation duration of the target pressing operation reaches a target threshold, a first selection operation with the account identification (A) of the second user account as an operation object is acquired, as shown in FIG. 11(a). Furthermore, as shown in FIG. 11(b), in case the target pressing operation is not ended and the operation object of the target pressing operation is switched from the account identification of the second user account to an account identification (B) of a fourth user account, a second selection operation with the account identification of the fourth user account as the operation object is acquired, as shown in FIG. 11(c). Furthermore, in response to the second selection operation, a fourth game picture of the fourth user account in the target game is displayed in the first game picture, where the at least one user account includes the fourth user account, and a display area of the fourth game picture is less than the display area of the first game picture.

According to the embodiment of this application, a second game picture is hidden when the target pressing operation is ended; or in case the target pressing operation is not ended and the operation object of the target pressing operation is switched from the account identification of the second user account to an account identification of a fourth user account, a second selection operation with the account identification of the fourth user account as the operation object is acquired; and in response to the second selection operation, a fourth game picture of the fourth user account in the target game is displayed in the first game picture, where the at least one user account includes the fourth user account, and a display area of the fourth game picture is less than the display area of the first game picture. In this way, the technical effect of improving the operation efficiency in the process of displaying the game picture is achieved.

As an embodiment, display a first game picture of the first user account in the target game, which specifically includes: display a game picture of layout information about the first user account on a first virtual element, where the first virtual element is a virtual element selected by the first user account and used for participating in the target game.

As an embodiment, display, in response to a selection operation triggered on an account identification of a second user account in the at least one user account, a second game picture of the second user account in the target game in the first game picture, which specifically includes: display, in response to the selection operation triggered on the account identification of the second user account, the second game picture in the first game picture, where layout information about the second user account on a second virtual element is displayed in the second game picture, and the second virtual element is a virtual element selected by the second user account and used for participating in the target game.

In this embodiment, the target game can be, but not limited to, a multi-player strategy game in the form of auto chess, in which players match a lineup of chess pieces on their own to play against the opponents, the hit point of the losing party is deducted, and the ranking is determined according to the elimination order, where the virtual elements can be such as, but not limited to the pieces in the game.

It should be noted that, in the game of auto chess, players in the game need to check the information of chess pieces and lineup layout of the opposing players (such as click on the opponent's avatar, switch to the opponent's chessboard, check chess pieces in the opponent's chessboard and a combat readiness region, and calculate the number and types of chess pieces on the spot) at all times within a specified period of time, which requires the players to repeatedly switch the battlefield several times in a single game. This redoubles the player's operation time, and reduces the time for players to perform other operations in the game turn, which causes such a time rush that the players cannot complete all the target operations within the specified period of time.

In this embodiment, the interactive way of checking opponent's battle information based on the player's avatar list is designed to reduce the player's operation cost, shorten the operation time, and realize the quick operation of viewing the opponent's battlefield information.

Taking another example for further illustration, in the game interface, players can long press the avatar in the player list, keep holding the screen with the fingers, and slide the player list (for example, there is a total of 8 players in the list) up and down to quickly view the battlefield information of the other seven players, which makes it easier for the players to quickly grasp the battlefield situation of each player and adjust the layout. Specifically, by long pressing the avatar of other player, a small pop-up window for quick spectator mode appears; and after the small pop-up window for quick spectator mode appears, the player can quickly view the battlefield of other players by sliding the list of player avatars up and down.

Figure 12:
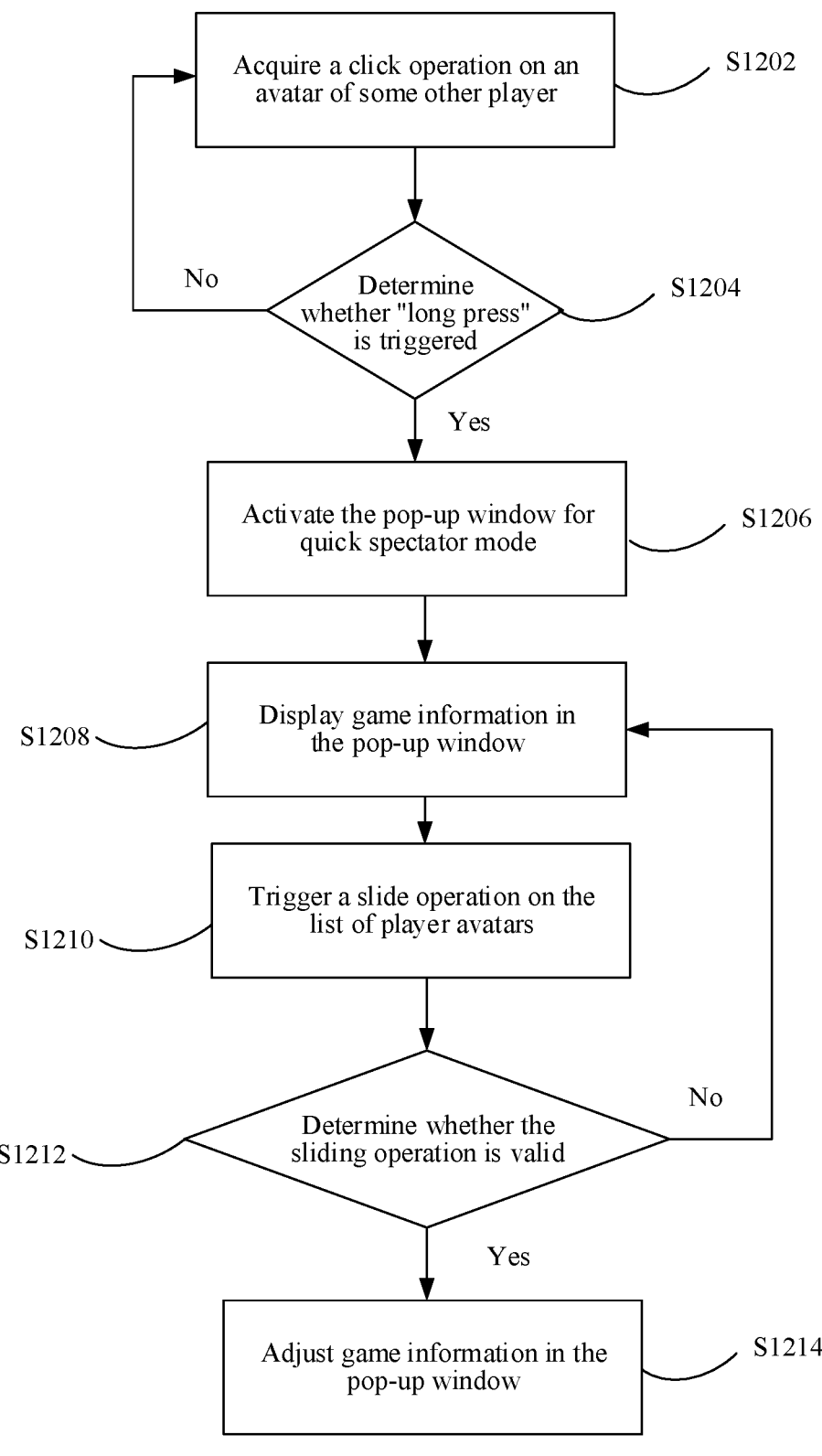
FIG. 12 is a schematic diagram of a method for displaying yet another game picture according to another embodiment of this application.

Taking another example for further illustration, as shown in FIG. 12, the specific steps are as follows:

Step S1202: Acquire a click operation on an avatar of some other player. For example, in a game interface, the player long presses the avatar of some other player, and a small pop-up window for quick spectator mode appears after the system determines "long press" is triggered.

Step S1204: Determine whether "long press" is triggered; if yes, perform step S1206; if not, perform step S1202;

Step S1206: Activate the pop-up window for quick spectator mode;

Step S1208: Display game information in the pop-up window;

Step S1210: Trigger a slide operation on the list of player avatars. For example, when the player drags the list of player avatars up and down with his/her finger, the system determines whether the player's finger enters an avatar region of another player.

Step S1212: Determine whether the sliding operation is valid: if yes, execute step S1214 (enter the avatar region of another player and switch the content of the pop-up window for quick spectator mode to the battlefield information of another player), if not, then perform step S1208 (skip entering the avatar region of another player, and keep the content of the pop-up window for quick spectator mode unchanged).

Step S1214: Adjust game information in the pop-up window.

According to the embodiment of this application, a game picture of layout information about the first user account on a first virtual element is displayed, where the first virtual element is selected by the first user account and used for participating in the target game. display, in response to the selection operation triggered on the account identification of the second user account, the second game picture in the first game picture, where layout information about the second user account on a second virtual element is displayed in the second game picture, and the second virtual element is a virtual element selected by the second user account and used for participating in the target game. In this way, it can better solve the problem that it is too tedious for the player to view opponent's chessboard in case of auto chess, and can help the player to view battlefield information such as other opponents' chessboards and chess pieces in own chessboard, and more quickly understand the current situation of the opponent, so that time is set aside for the player to develop a coping strategy, and thus the effect of improving the user's game experience is achieved.

As an embodiment, display a first game picture of the first user account in the target game, which specifically includes: display a game picture of the target game under a viewing angle of the first user account.

As an embodiment, display, in response to a selection operation triggered on an account identification of a second user account in the at least one user account, a second game picture of the second user account in the target game in the first game picture, which specifically includes: display, in response to the selection operation triggered on the account identification of the second user account, a game picture of the target game under a viewing angle of the second user account in the first game picture.

In this embodiment, the game picture of the target game under a viewing angle of the user account can be, but not limited to, a real-time game picture displayed in a client corresponding to the user account, and the real-time game picture can change with the movement of a virtual camera by the corresponding client; meanwhile, acquiring the game picture under a viewing angle of other user accounts can help the player better understand the operating intentions of other user accounts: if other accounts are from teammates, the player can strengthen cooperation with them, and if other accounts are from enemies, the player can take the preemptive opportunities.

Taking another example for further illustration, as shown in FIG. 4, the first game picture 402 can be, but not limited to, a game picture under a viewing angle of the first user account, while the second game picture 406 shown in FIG. 4(*b*) can be, but not limited to, a game picture under a viewing angle of the second user account. For example, if the current viewing angle of the second user account is the viewing angle of a sighting telescope, then the game picture under the viewing angle of the sighting telescope is displayed, or the game picture currently displayed is displayed by the second user account on the client corresponding to the second user account.

According to the embodiment of this application, a game picture of the target game under a viewing angle of the first user account is displayed; and in response to the selection operation triggered on the account identification of the second user account, a game picture of the target game under a viewing angle of the second user account is displayed in the first game picture. In this way, the purpose of providing the user with a more comprehensive game display function that fits the game experience is achieved, and then the effect of improving the user's game experience is achieved.

As an embodiment, display a first game picture of the first user account in the target game, which specifically includes: display an action picture of a first virtual object controlled by the first user account in a virtual scenario of the target game.

As an embodiment, display, in response to a selection operation triggered on an account identification of a second user account in the at least one user account, a second game picture of the second user account in the target game in the first game picture, which specifically includes: display, in response to the selection operation triggered on the account identification of the second user account, an action picture of a second virtual object controlled by the second user account in the virtual scenario in the first game picture.

In this embodiment, the action picture of the virtual object in the virtual scenario can be, but not limited to, a game picture with the virtual object controlled by the user account as a center of the screen.

Taking another example for further illustration, as shown in FIG. 5, the first game picture 502 may be, but not limited to, a game picture with the virtual object (e.g., a virtual objecting holding a virtual attacking prop "gun") controlled by the first user account as a center of the screen, while the second game picture 506 shown in FIG. 5(*b*) may be, but not limited to, a game picture with the virtual object (e.g., a virtual objecting holding a virtual attacking prop "sword") controlled by the second user account as a center of the screen. For example, if the virtual object controlled by the second user account is attacking a virtual monster, then a game picture about the virtual object controlled by the second user account attacking a virtual monster and with the virtual object controlled by the second user account as the center of the center is displayed.

According to the embodiment of this application, an action picture of a first virtual object controlled by the first user account in a virtual scenario of the target game is displayed; and in response to the selection operation triggered on the account identification of the second user account, an action picture of the second virtual object controlled by the second user account in the virtual scenario is displayed in the first game picture. In this way, the purpose of providing the user with a more comprehensive game display function that fits the game experience is achieved, and then the effect of improving the user's game experience is achieved.

It is to be understood that relevant data such as the game picture of the user account are involved in the specific implementation of this application. Therefore, the above embodiments of this application cannot be applied to specific products or technologies without user's permission or consent, and the collection, use and processing of relevant data should be performed in compliance with the relevant laws, regulations and standards of countries or regions involved.

It should be noted that, To simplify the description, the foregoing method embodiments are described as a series of action combination. But persons of ordinary skill in the art should know that the present application is not limited to any described sequence of the action, as some steps can adopt other sequences or can be executed simultaneously according to the present application. Secondarily, a person skilled in the art should know that the embodiments described in the specification all belong to exemplary embodiments and the involved actions and modules are not necessary for the present application.

Figure 13:
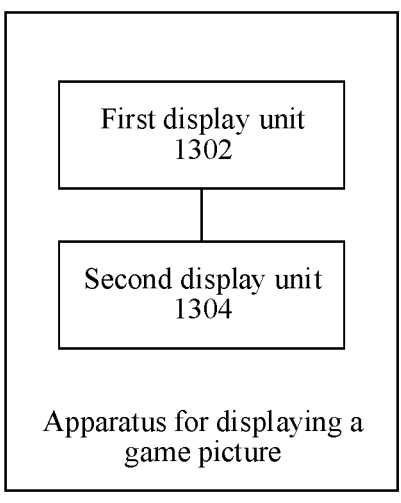
FIG. 13 is a schematic diagram of an apparatus for displaying a game picture according to one embodiment of this application.

According to another aspect of the embodiments of this application, an apparatus for displaying a game picture, for implementing the method for displaying the game picture, is further provided. As shown in FIG. 13, the apparatus includes:

a first display unit 1302 configured to display a first game picture of a first user account in a target game, where the target game is a game in which at least two user accounts participate, the at least two user accounts include the first user account, and an account identification of at least one user account of the at least two user accounts except the first user account is displayed in the first game picture; and a second display unit 1304 configured to display, in response to a selection operation triggered on an account identification of a second user account in the at least one user account, a second game picture of the second user account in the target game in the first game picture, where a display area of the second game picture is less than a display area of the first game picture.

In this embodiment, the foregoing apparatus for displaying a game picture can be applied to such as, but not limited to, a game process to control display of the game picture, e.g., to display a process screen (the first game picture) of the first user account in the target game on a target client of the first user account, and in case a selection operation is acquired from the account identification of the second user account in the first game picture, display, in response to the selection operation, a process screen (the second game picture) of the second user account in the target game in the first game picture in the form of PIP.

In this embodiment, the target game can be, but not limited to, a cooperative/confrontational game in which multiple user accounts participate. Taking the cooperative game as an example, multiple user accounts participating in the same target game are in the same faction and jointly complete a first virtual task in the form of cooperation. Taking the confrontational game as another example, multiple user accounts participating in the same target game are divided into at least two factions and complete a second virtual task in the form of confrontation.

In this embodiment, the first game picture may be, but not limited to, a game picture under a viewing angle of the first user account, and the second game picture may be, but not limited to, a game picture under a viewing angle of the second user account; or the first game picture may be, but not limited to, a game picture with the virtual object controlled by the first user account as the center, and the second game picture may be, but not limited to, a game picture with the virtual object controlled by the second user account as the center; or the first game picture/second game picture may be, but not limited to, game pictures of the same type, such as the game picture of a combat readiness interface.

In this embodiment, the display area of the second game picture is less than the display area of the first game picture, that is, the second game picture may belong to the first game picture, or the second game picture may be a sub-picture of the first game picture, which is not limited herein. Since the display area of the second game picture is less than the display area of the first game picture, thus a viewer can acquire game information of the first user account and the second user account in a target game at the same time when the second game picture and the first game picture are displayed simultaneously, which can improve user's game experience no matter in terms of comparing game information of different user accounts, or in terms of improving the execution efficiency of a virtual task with more diverse game information.

It should be noted that, by using the display mode of PIP, the game pictures of multiple user accounts can be displayed at the same time in the game process, thus improving the display diversity of the game picture. In this way, the use of more diverse display modes can not only improve the display fullness of the game picture, but also provide the user with more comprehensive reference information, which improves the user's game experience.

The specific embodiment may be referenced to the example shown in the apparatus for displaying the game picture, and details are not described herein again in this example.

According to the embodiment of this application, a first game picture of a first user account in a target game can be displayed, where the target game is a game in which at least two user accounts participate, the at least two user accounts include the first user account, and an account identification of at least one user account of the at least two user accounts except the first user account is displayed in the first game picture; and in response to a selection operation triggered on an account identification of a second user account in the at least one user account, a second game picture of the second user account in the target game is displayed in the first game picture, where a display area of the second game picture is less than a display area of the first game picture. By using the display mode of PIP, game pictures of multiple user accounts are displayed at the same time during the game, which achieves the purpose of improving the display fullness of the game picture using more diverse display modes, and realizes the technical effect of improving the display diversity of the game picture.

As an embodiment, the first display unit 1302 includes: a first display module configured to display the second game picture within a first region associated with the account identification of the second user account.

The apparatus further includes: a third display unit configured to display, in response to a selection operation triggered on an account identification of a third user account in the at least one user account, a third game picture of the third user account in the target game within a second region associated with the account identification of the third user account after displaying the second game picture of the second user account in the target game in the first game picture, where the first region is different from the second region.

The specific embodiment may be referenced to the example shown in the apparatus for displaying the game picture, and details are not described herein again in this example.

As an embodiment, the first display unit 1302 includes: a second display module configured to display the second game picture within a target region.

The apparatus further includes: a fourth display unit configured to display, in response to a selection operation triggered on an account identification of the third user account in the at least one user account, a third game picture of the third user account in the target game within the target region after displaying the second game picture of the second user account in the target game in the first game picture.

The specific embodiment may be referenced to the example shown in the apparatus for displaying the game picture, and details are not described herein again in this example.

As an embodiment, the apparatus includes:

an adjustment unit configured to adjust, in response to a target adjustment operation on the second game picture, a display shape of the second game picture after displaying the second game picture of the second user account in the target game in the first game picture.

The specific embodiment may be referenced to the example shown in the method for displaying the game picture, and details are not described herein again in this example.

As an embodiment, the adjustment unit includes:

a first adjustment module configured to shrink, in response to a first adjustment operation on the second game picture, the display area of the second game picture, where in case the display area of the second game picture is less than or equal to a hidden threshold, the second game picture is hidden; and a second adjustment module configured to expand, in response to a second adjustment operation on the second game picture, the display area of the second game picture to a target display area, where the target display area is equal to the display area of the first game picture.

The specific embodiment may be referenced to the example shown in the method for displaying the game picture, and details are not described herein again in this example.

As an embodiment, the second display unit 1304 includes:

a third display module configured to display the second game picture and target key information in the first game picture, where the target key information includes at least one of the following: real-time game information of the second user account in the target game and historical game information of the second user account in a game joined before.

The specific embodiment may be referenced to the example shown in the method for displaying the game picture, and details are not described herein again in this example.

As an embodiment, the apparatus includes:

a first acquisition unit configured to acquire a target pressing operation triggered on an account identification of the second user account before the display, in response to a selection operation triggered on an account identification of a second user account in the at least one user account, a second game picture of the second user account in the target game in the first game picture; and a second acquisition unit configured to acquire, in case an operation duration of the target pressing operation reaches a target threshold, a first selection operation with the account identification of the second user account as an operation object before the display, in response to a selection operation triggered on an account identification of a second user account in the at least one user account, a second game picture of the second user account in the target game in the first game picture, where the first selection operation includes a selection operation triggered on the account identification of the second user account.

The specific embodiment may be referenced to the example shown in the method for displaying the game picture, and details are not described herein again in this example.

As an embodiment, the apparatus includes:

a hiding unit configured to hide a second game picture when the target pressing operation is ended after acquiring a first selection operation with the account identification of the second user account as an operation object; or a third acquisition unit configured to acquire, in case the target pressing operation is not ended and the operation object of the target pressing operation is switched from the account identification of the second user account to an account identification of a fourth user account, a second selection operation with the account identification of the fourth user account as the operation object after the acquire a first selection operation with the account identification of the second user account as an operation object; and a fifth display unit configured to display, in response to the second selection operation, a fourth game picture of the fourth user account in the target game in the first game picture, where the at least one user account includes the fourth user account, and a display area of the fourth game picture is less than the display area of the first game picture.

The specific embodiment may be referenced to the example shown in the method for displaying the game picture, and details are not described herein again in this example.

As an embodiment, the first display unit 1302 includes: a third display module configured to display a game picture of layout information about the first user account on a first virtual element, where the first virtual element is a virtual element selected by the first user account and used for participating in the target game.

The second display unit 1304 includes: a fourth display module configured to display, in response to the selection operation triggered on the account identification of the second user account, the second game picture in the first game picture, where layout information about the second user account on a second virtual element is displayed in the second game picture, and the second virtual element is a virtual element selected by the second user account and used for participating in the target game.

The specific embodiment may be referenced to the example shown in the method for displaying the game picture, and details are not described herein again in this example.

As an embodiment, the first display unit 1302 includes: a fifth display module configured to display a game picture of the target game under a viewing angle of the first user account.

The second obtaining unit 1304 includes: a sixth display module configured to display, in response to the selection operation triggered on the account identification of the second user account, a game picture of the target game under a viewing angle of the second user account in the first game picture.

The specific embodiment may be referenced to the example shown in the method for displaying the game picture, and details are not described herein again in this example.

As an embodiment, the first display unit 1302 includes: a seventh display module configured to display an action picture of a first virtual object controlled by the first user account in a virtual scenario of the target game.

The second display unit 1304 includes: an eighth display module configured to display, in response to the selection operation triggered on the account identification of the second user account, an action picture of a second virtual object controlled by the second user account in the virtual scenario in the first game picture.

The specific embodiment may be referenced to the example shown in the method for displaying the game picture, and details are not described herein again in this example.

Figure 14:
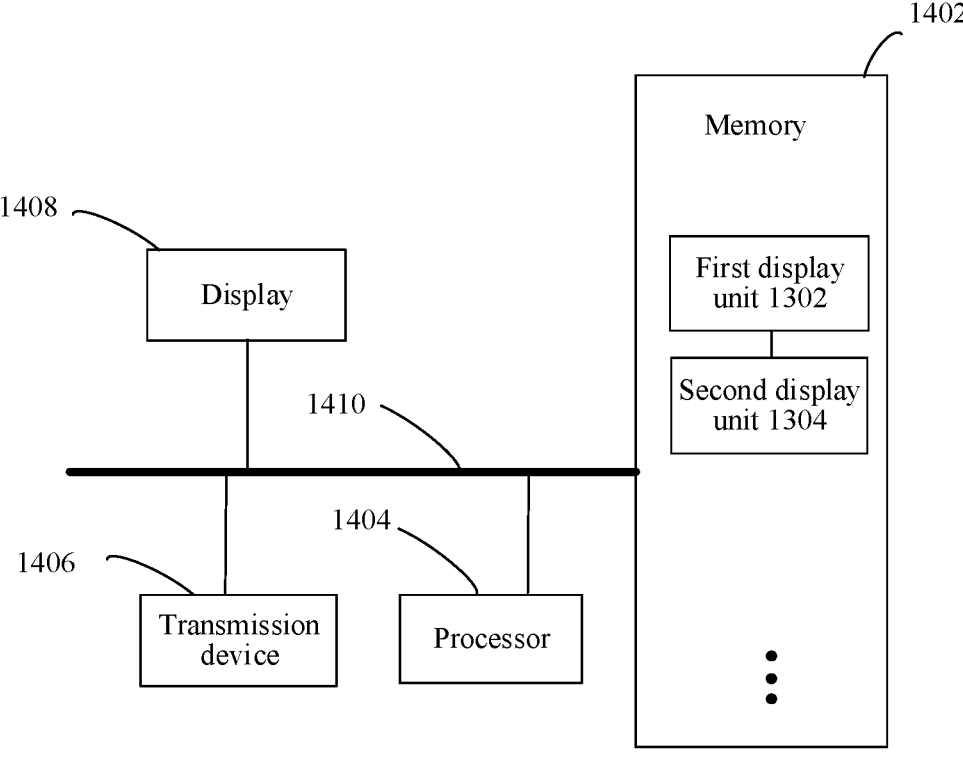
FIG. 14 is a schematic structural diagram of an electronic device according to an embodiment of this application.

According to yet another aspect of the embodiments of this application, an electronic device for implementing the method for displaying the game picture is further provided. As shown in FIG. 14, the electronic device includes a memory 1402 and a processor 1404, where a computer program is stored in the memory 1402, and the processor 1404 is set to perform the steps of any one of the method embodiments through the computer program.

In this embodiment, the electronic device may be located in at least one of a plurality of network devices in a computer network.

A person of ordinary skill in the art may understand that, the structure shown in FIG. 14 is only illustrative. The electronic apparatus may be a terminal device such as a smartphone (such as an Android mobile phone or an iOS mobile phone), a tablet computer, a palmtop computer, a mobile Internet device (MID), or a PAD. FIG. 14 does not limit the structure of the foregoing electronic device. For example, the electronic device may further include more or less components (for example, a network interface and a display apparatus) than those shown in FIG. 14, or has a configuration different from that shown in FIG. 14.

The memory 1402 may be configured to store a software program and a module, for example, a program instruction/module corresponding to a method and an apparatus for displaying the game picture in the embodiments of this application, and the processor 1404 performs various functional applications and data processing by running a software program and a module stored in the memory 1402, that is, implements the method for displaying the game picture. The memory 1402 may include a high-speed random memory, and may also include a non-volatile memory, for example, one or more magnetic storage apparatuses, a flash memory, or another nonvolatile solid-state memory. In some embodiments, the memory 1402 may further include memories remotely disposed relative to the processor 1404, and the remote memories may be connected to a terminal through a network. Examples of the network include, but are not limited to, the Internet, an intranet, a local area network, a mobile communication network, and a combination thereof. The memory 1402 may be specifically used to, but not limited to, store information such as the first game picture and the second game picture. Exemplarily, as shown in FIG. 14, the foregoing memory 1402 may include, but not limited to, a first display unit 1302 and a second display unit 1304 in the foregoing apparatus for displaying a game picture. In addition, the memory may further include but not limited to other module units in the apparatus for displaying the game picture, which will not be elaborated in this example.

In an embodiment, the foregoing transmission device 1406 is configured to receive or transmit data via a network. Specific examples of the foregoing network include a wired network and a wireless network. In an example, the transmission device 1406 includes a network interface controller (NIC). The NIC may be connected to another network device and a router by using a network cable, so as to communicate with the Internet or a local area network. In an example, the transmission device 1406 is a radio frequency (RF) module, which communicates with the Internet in a wireless manner.

The electronic device further includes: a display 1408 configured to display the foregoing information such as the first game picture and the second game picture; and a connecting bus 1410, configured to connect various module parts in the electronic device.

In other embodiments, the terminal device or server may be a node in a distributed system, where the distributed system may be a blockchain system, and the blockchain system may be a distributed system formed by connecting a plurality of nodes through network communication. Nodes form peer to peer (P2P) network may be formed between nodes, any form of device, such as the server, the terminal and other electronic devices, may be added to the P2P network to become one node in the blockchain system.

The sequence numbers of the foregoing embodiments of this application are merely for description purpose but do not imply the preference among the embodiments.

It should be noted that, The computer system of the electronic device shown in FIG. 9 is merely an example, and does not constitute any limitation on functions and use ranges of the embodiments of this application.

According to the embodiment of this application, the process described in the flowcharts of the methods may be implemented as a computer software program. For example, the embodiment of this application includes a computer program product, the computer program product including a computer program and/or instruction carried on a computer-readable medium, the computer program and/or instruction including a program code used for performing the methods shown in the flowcharts. In such an embodiment, the computer program may be downloaded and installed from a network through the communication part 909, and/or installed from the removable medium 911. When being executed by the CPU, the computer program performs various functions defined in the system of this application.

According to one aspect of this application, a computer readable storage medium is provided and configured to store a computer program including a computer instruction, a processor of a computer device reads the computer instruction from the computer readable storage medium, and the processor executes the computer instruction to cause the computer device to implement the methods provided in the various implementations described above.

In this embodiment, A person of ordinary skill in the art can understand that, all or some steps in the methods in the foregoing embodiments may be performed by a program instructing related hardware of a terminal device. The program may be stored in a computer readable storage medium. a flash drive, a Read-Only Memory (ROM), a Random Access Memory (RAM), a magnetic disk, an optical disc, and the like.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. The above descriptions are merely exemplary implementations of this application. It should be noted that, a person of ordinary skill in the art may further make various improvements and refinements without departing from the spirit of this application. All such modifications and refinements should also be deemed to be covered by the protection scope of this application.

What is claimed is:

1. A method for displaying a game picture performed by an electronic device, the method comprising:

displaying a first game picture of a first user account in a target game associated with at least one additional user account, the first game picture including an action picture of a first virtual object controlled by the first user account in a virtual scenario of the target game and an account identification of the at least one additional user account; and in response to a selection operation triggered on an account identification of a second user account in the at least one additional user account, displaying a second game picture of the second user account in the target game within the first game picture, wherein the second game picture a game picture of the target game under a viewing angle of the second user account.

2. The method according to claim 1, wherein the displaying a second game picture of the second user account in the target game within the first game picture comprises: displaying the second game picture within a first region associated with the account identification of the second user account; and the method further comprises:

in response to a selection operation triggered on an account identification of a third user account in the at least one additional user account, displaying a third game picture of the third user account in the target game within a second region associated with the account identification of the third user account, wherein the first region is different from the second region.

3. The method according to claim 1, wherein the displaying a second game picture of the second user account in the target game within the first game picture comprises: displaying the second game picture within a target region; and the method further comprises: in response to a selection operation triggered on an account identification of a third user account in the at least one additional user account, a third game picture of the third user account in the target game within the target region.

4. The method according to claim 1, wherein the displaying a second game picture of the second user account in the target game in the first game picture comprises:

displaying target key information in the second game picture, wherein the target key information comprises at least one of the following: real-time game information of the second user account in the target game and historical game information of the second user account in a game joined before.

5. The method according to claim 1, wherein before the displaying, in response to a selection operation triggered on an account identification of a second user account in the at least one user account, a second game picture of the second user account in the target game in the first game picture, the method further comprises:

acquiring a target pressing operation triggered on the account identification of the second user account; and in case an operation duration of the target pressing operation reaches a target threshold, acquiring a first selection operation with the account identification of the second user account as an operation object, wherein the first selection operation comprises a selection operation triggered on the account identification of the second user account.

6. The method according to claim 1, wherein the displaying a first game picture of a first user account in a target game comprises: displaying a game picture of the target game under a viewing angle of the first user account; and the displaying a second game picture of the second user account in the target game within the first game picture comprises: displaying a game picture of the target game under a viewing angle of the second user account.

7. An electronic device, comprising a memory and a processor, the memory storing a computer program that, when executed by the processor, causes the electronic device to perform a method for displaying a game picture including:

displaying a first game picture of a first user account in a target game associated with at least one additional user account, the first game picture including an action picture of a first virtual object controlled by the first user account in a virtual scenario of the target game and an account identification of the at least one additional user account; and in response to a selection operation triggered on an account identification of a second user account in the at least one additional user account, displaying a second game picture of the second user account in the target game within the first game picture, wherein the second game picture a game picture of the target game under a viewing angle of the second user account.

8. The electronic device according to claim 7, wherein the displaying a second game picture of the second user account in the target game within the first game picture comprises: displaying the second game picture within a first region associated with the account identification of the second user account; and the method further comprises:

in response to a selection operation triggered on an account identification of a third user account in the at least one additional user account, displaying a third game picture of the third user account in the target game within a second region associated with the account identification of the third user account, wherein the first region is different from the second region.

9. The electronic device according to claim 7, wherein the displaying a second game picture of the second user account in the target game within the first game picture comprises: displaying the second game picture within a target region; and the method further comprises: in response to a selection operation triggered on an account identification of a third user account in the at least one additional user account, a third game picture of the third user account in the target game within the target region.

10. The electronic device according to claim 7, wherein the displaying a second game picture of the second user account in the target game in the first game picture comprises:

displaying target key information in the second game picture, wherein the target key information comprises at least one of the following: real-time game information of the second user account in the target game and historical game information of the second user account in a game joined before.

11. The electronic device according to claim 7, wherein before the displaying, in response to a selection operation triggered on an account identification of a second user account in the at least one user account, a second game picture of the second user account in the target game in the first game picture, the method further comprises:

acquiring a target pressing operation triggered on the account identification of the second user account; and in case an operation duration of the target pressing operation reaches a target threshold, acquiring a first selection operation with the account identification of the second user account as an operation object, wherein the first selection operation comprises a selection operation triggered on the account identification of the second user account.

12. The electronic device according to claim 7, wherein the displaying a first game picture of a first user account in a target game comprises: displaying a game picture of the target game under a viewing angle of the first user account; and the displaying a second game picture of the second user account in the target game within the first game picture comprises: displaying a game picture of the target game under a viewing angle of the second user account.

13. A non-transitory computer-readable storage medium, storing a computer program stored therein, the computer program, when executed by a processor of a computer device, causing the electronic device to implement a method for displaying a game picture Including:

displaying a first game picture of a first user account in a target game associated with at least one additional user account, the first game picture including an action picture of a first virtual object controlled by the first user account in a virtual scenario of the target game and an account identification of the at least one additional user account; and in response to a selection operation triggered on an account identification of a second user account in the at least one additional user account, displaying a second game picture of the second user account in the target game within the first game picture, wherein the second game picture a game picture of the target game under a viewing angle of the second user account.

14. The non-transitory computer-readable storage medium according to claim 13, wherein the displaying a second game picture of the second user account in the target game within the first game picture comprises: displaying the second game picture within a first region associated with the account identification of the second user account; and the method further comprises:

in response to a selection operation triggered on an account identification of a third user account in the at least one additional user account, displaying a third game picture of the third user account in the target game within a second region associated with the account identification of the third user account, wherein the first region is different from the second region.

15. The non-transitory computer-readable storage medium according to claim 13, wherein the displaying a second game picture of the second user account in the target game within the first game picture comprises: displaying the second game picture within a target region; and the method further comprises: in response to a selection operation triggered on an account identification of a third user account in the at least one additional user account, a third game picture of the third user account in the target game within the target region.

16. The non-transitory computer-readable storage medium according to claim 13, wherein the displaying a second game picture of the second user account in the target game in the first game picture comprises:

displaying target key information in the second game picture, wherein the target key information comprises at least one of the following: real-time game information of the second user account in the target game and historical game information of the second user account in a game joined before.

17. The non-transitory computer-readable storage medium according to claim 13, wherein before the displaying, in response to a selection operation triggered on an account identification of a second user account in the at least one user account, a second game picture of the second user account in the target game in the first game picture, the method further comprises:

acquiring a target pressing operation triggered on the account identification of the second user account; and in case an operation duration of the target pressing operation reaches a target threshold, acquiring a first selection operation with the account identification of the second user account as an operation object, wherein the first selection operation comprises a selection operation triggered on the account identification of the second user account.

\* \* \* \* \*